United States Patent Office 3,249,489
Patented May 3, 1966

1

3,249,489
LAMINATED SAFETY GLASS
Edward Lavin, Longmeadow, and George E. Mont, Springfield, Mass., assignors, by mesne assignments, to Monsanto Company, a corporation of Delaware
No Drawing. Filed May 17, 1965, Ser. No. 456,535
19 Claims. (Cl. 161—199)

This invention relates to improved laminated safety-glass. More particularly, this invention relates to laminated safety-glass having an interlayer of a plasticized polyvinyl acetal, containing a synergistic mixture of salts which has higher resistance to pentration.

Laminated safety-glass comprises two or more glass panels bound with an interlayer of a transparent, adherent plastic. The usual plastic interlayer is a plasticized polyvinyl acetal resin formed in a sheet or film with a thickness of about 0.015 inch or more. The major commercial use of these safety-glass compositions is for automobile windshields, as well as for windshields in other moving vehicles. The ever increasing number of automobiles and the fast speed of travel today coupled with the greater area of modern day windshields has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The interlayer therefore benefits the structure not only by adhering to the glass particles but also has the added advantage of absorbing energy on impact thereby decreasing the possibility of skull fracture which may occur when a head strikes the windshield, while also supplying added resistance penetration.

The interlayers in present day commercial windshields usually contain about 0.1 to 0.8% moisture. It has been reported that some increase in resistance to penetration is found if the moisture content of the plastic interlayer is considerably higher. However, the presence of increased moisture alone to improve the penetration resistance sufficiently is impractical because the clarity of the windshield is adversely affected by the formation of bubbles between the interlayer and the glass or within the interlayer. Further, the presence of excess moisture may cause delamination. Consequently, the automotive and laminating industries have not been able to take significant advantage of this method of improving resistance to penetration.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

Another object of this invention is to provide methods and means to accomplish the preceding objects.

2

These and other objects are accomplished in a laminated safety-glass by bonding two glass panels with an interlayer of a plasticized polyvinyl acetal resin; said interlayers having a moisture content of 0.1 to 0.8% by weight and containing sufficient metal salts of organic acids to produce an Alkalinity Titer of 10 to 50, said salts being a mixture of at least one metal acetate and at least one metal salt of a saturated aliphatic dicarboxylic acid of from 4 to 9 carbon atoms, wherein, in each instance, said metal is independently selected from the group consisting of alkali metals, alkaline earth metals, and metals of Groups I–B, II–B, and III–A of the Periodic Table, said mixture containing sufficient metal acetate to produce an Alkalinity Titer of at least about 5 and up to about 80% of the total Alkalinity Titer.

The Alkalinity Titer is the number of milliliters of 0.01 normal hydrochloric acid required to neutralize 100 grams of the polyvinyl acetal resin. This is an arbitrary standard used to designate the alkalinity of the resin. The Alkalinity Titer is usually determined prior to plasticization by dissolving 7 grams of the polyvinyl acetal resin in 250 cc. of preneutralized ethyl alcohol and titrating with 0.005 normal hydrochloric acid to the endpoint using brom-phenol blue indicator and calculating from the result obtained to determine the milliliters of 0.01 normal acid required for 100 grams resin.

It is customary to stabilize polyvinyl acetals for interlayers with potassium or sodium hydroxide and/or potassium or sodium acetate by adding small amounts of these materials. These are normally added during the preparation of the polyvinyl acetal. However, these materials increase the titer level without improved the penetration resistance or impact strength of the laminate except at objectionably high titer levels. Moreover, large amounts of these salts or bases tend to increase the color of the extruded plasticized resin which is undesirable in an interlayer. The presence of such alkaline materials produces the Alkalinity Titer in conventional polyvinyl acetate interlayers.

The following examples are given in illustration of the invention and are not intended as limitations thereof. All parts and percentages are by weight unless otherwise specified.

Examples I to V are set forth as controls to illustrate the poorer results obtained when the salts are used alone and not in synergistic combination.

*Example 1*

(a) This example uses a conventional polyvinyl acetal interlayer for safety-glass. It is a polyvinyl butyral containing 18.8% vinyl alcohol by weight and having an Alkalinity Titer of 20. This titer is due to the presence of potassium acetate (K acetate) in the polyvinyl butyral. The resin is plasticized with 44 parts triethylene glycol di(2-ethyl butyrate) and has a moisture content of about 0.4%. The interlayer is formed into sheets 0.015 inch thick (15 gauge) and 0.030 inch thick (30 gauge). These interlayer sheets are used as controls.

Sets of ten glass laminates are individually prepared by interposing the 15 gauge interlayer between two 24 x 36 x 0.125 inch panels of glass and the 30 gauge interlayer between two 12 x 12 x 0.125 inch panels of glass. The resulting laminates are then subjected to a temperature of about 275° F. at a pressure of 185 p.s.i. for approximately 10 minutes to bond the laminate or panels together.

Further sets of glass laminates are similarly prepared as above using plasticized polyvinyl butyral containing potassium acetate at varying levels producing the following Alkalinity Titers:

(b) 29
(c) 42
(d) 56

The laminates prepared by the above procedure are then subjected to Mean Break Height tests according to the recently established tentative specifications set up by the Society of Automotive Engineers, the Subcommittee on Automotive Glazing and the results tabulated in Table I.

In essence, the Mean Break Height test comprises placing the laminate in a horizontal position with a frame or edge support and while maintaining a constant laminate temperature, which is 70° F. in this series, allowing a 22 pound spherical ball (referred to as a head form) to drop from a designated height against approximately the middle of the laminate made with the 15 gauge interlayer. This test is repeated at increasing ball-drop heights to determine the approximate height in feet at which 50% of the laminates tested will resist penetration. In other words, the Mean Break Height of a laminate is a measure of the ability of that laminate to absorb the energy of an impacting object. The same test is used with the laminates made with 30 gauge interlayer except that a 5 pound steel ball is used on the smaller laminate.

*Example II*

(a) Another set of ten glass laminates is similarly prepared using 15 gauge and 30 gauge plasticized polyvinyl butyral resin sheet interlayers (plasticized as in Example I) having a moisture content of about 0.4% and an Alkalinity Titer of 13 produced by the presence of potassium acid succinate (KH succinate) instead of potassium acetate.

Further sets of ten glass laminates are prepared as above except that the amount of potassium acid succinate (KH succinate) in the polyvinyl butyral is varied to produce the following Alkalinity Titers:

(a) 13
(b) 21
(c) 35
(d) 45
(e) 60

After processing, these laminates are tested as in Example I and the results are reported in Table I.

*Example III*

Similar sets of ten glass laminates are prepared according to the procedure of Example I except that the Alkalinity Titer of the polyvinyl butyral is produced by potassium succinate ($K_2$ succinate) at the following titers:

(a) 14
(b) 25
(c) 35
(d) 45

After processing, these laminates are tested as in Example I and the results are reported in Table I.

*Example IV*

Similar sets of ten glass laminates are prepared according to the procedure of Example I except that the Alkalinity Titer of the polyvinyl butyral is produced by potassium acid glutarate (KH glutarate) at the following titers:

(a) 12
(b) 23
(c) 33
(d) 53
(e) 57

After processing, these laminates are tested as in Example I and the results are reported in Table I.

*Example V*

Similar sets of ten glass laminates are prepared according to the procedure of Example I except that the Alkalinity Titer of the polyvinyl butyral is produced by potassium acid adipate (KH Adipate) at the following titers:

(a) 11
(b) 19
(c) 22
(d) 30
(e) 40

The results of testing the sets of processed laminates are tabulated below.

TABLE I.—EXAMPLES I–V

| Example | Percent Moisture Content | Alkalinity Titer, cc. | Mean Break Height (Feet) | |
|---|---|---|---|---|
| | | | 15 Gauge [1] | 30 Gauge [1] |
| K Acetate: | | | | |
| I (a) | 0.40 | 20 | 2.3 | 7.0 |
| (b) | 0.40 | 29 | 2.4 | 7.2 |
| (c) | 0.43 | 42 | 2.9 | 8.5 |
| (d) | 0.48 | 56 | 5.8 | 16.0 |
| KH Succinate: | | | | |
| II (a) | 0.40 | 13 | 2.6 | 11.6 |
| (b) | 0.38 | 21 | 3.5 | 14.0 |
| (c) | 0.49 | 35 | 5.5 | 16.0 |
| (d) | 0.42 | 45 | 7.0 | 16.6 |
| (e) | 0.43 | 60 | 7.3 | 17.3 |
| $K_2$ Succinate: | | | | |
| III (a) | 0.40 | 14 | 2.4 | 10.3 |
| (b) | 0.43 | 25 | 2.7 | 11.6 |
| (c) | 0.41 | 35 | 4.0 | 14.8 |
| (d) | 0.41 | 45 | 5.8 | 16.4 |
| KH Glutarate: | | | | |
| IV (a) | 0.43 | 12 | 3.1 | 12.7 |
| (b) | 0.41 | 23 | 4.1 | 15.4 |
| (c) | 0.44 | 33 | 5.0 | 18.4 |
| (d) | 0.42 | 53 | 5.8 | 19.3 |
| (e) | 0.40 | 57 | 6.3 | 19.3 |
| KH Adipate: | | | | |
| V (a) | 0.54 | 11 | 2.4 | 11.4 |
| (b) | 0.51 | 19 | 2.7 | 11.6 |
| (c) | 0.53 | 22 | 3.3 | 13.4 |
| (d) | 0.56 | 30 | 4.1 | 15.5 |
| (e) | 0.43 | 40 | 4.6 | 15.8 |

[1] Refers to thickness of interlayer used.

The results in the above table indicate that glass laminates employing interlayers of polyvinyl butyral containing potassium acetate or potassium salts of aliphatic saturated dicarboxylic acids show good penetration resistance only at titer levels generally greater than 40. The present invention, as will be seen below, teaches a method for achieving good penetration resistance at lower titer levels.

*Examples VI to XXXIV*

Additional sets of ten glass laminates are again prepared according to the procedure of Example I, but here the Alkalinity Titer is produced with synergistic mixtures of salts of a metal acetate and a metal salt of a saturated aliphatic dicarboxylic acid.

TABLE II.—SYNERGISTIC MIXTURES

| Example | K Acetate Titer, (cc.) | Salt Added | Total Titer, (cc.) | Mean Break Height, feet | | Percent H₂O |
|---|---|---|---|---|---|---|
| | | | | 15 gauge | 30 gauge | |
| VI | 10 | KH Succinate | 13 | 3.3 | 13.4 | 0.50 |
| VII | 10 | ___do___ | 15 | 4.7 | 15.0 | 0.55 |
| VIII | 10 | ___do___ | 19 | 7.1 | 17.5 | 0.43 |
| IX | 10 | ___do___ | 22 | 7.3 | 17.8 | 0.48 |
| X | 10 | ___do___ | 30 | 7.3 | 18.0 | 0.32 |
| XI | 10 | ___do___ | 17 | 5.6 | 16.5 | 0.43 |
| XII | 12 | ___do___ | 24 | 8.5 | 19.4 | 0.41 |
| XIII | 11 | ___do___ | 29 | 8.4 | 19.5 | 0.44 |
| XIV | 21 | ___do___ | 36 | 8.6 | 19.8 | 0.41 |
| XV | 80 | None | 80 | 7.5 | 17.8 | 0.41 |
| XVI | 13 | K₂ Succinate | 37 | 7.5 | 19.2 | 0.42 |
| XVII | 15 | KH Glutarate | 19 | 2.4 | 9.1 | 0.38 |
| XVIII | 15 | ___do___ | 29 | 8.4 | 20.0 | 0.55 |
| XIX | 15 | K₂ Glutarate | 18 | 2.3 | 8.6 | 0.45 |
| XX | 15 | ___do___ | 41 | 7.5 | 18.4 | 0.54 |
| XXI | 15 | KH Adipate | 32 | 5.7 | 16.8 | 0.40 |
| XXII | 15 | ___do___ | 26 | 4.6 | 15.5 | 0.60 |
| XXIII | 13 | KH Sebacate | 28 | 2.3 | 9.1 | 0.40 |
| XXIV | 13 | K₂ Sebacate | 28 | 2.3 | 8.5 | 0.35 |
| XXV | 15 | KH Succinate | 20 | 3.8 | 14.1 | 0.48 |
| XXVI | 15 | ___do___ | 25 | 8.2 | 19.0 | 0.43 |
| XXVII | 15 | ___do___ | 29 | 7.5 | 18.4 | 0.47 |
| XXVIII | 15 | ___do___ | 35 | 7.5 | 20.0 | 0.47 |
| XXIX | 15 | KH Glutarate | 27 | 8.0 | 20.1 | 0.37 |
| XXX | 15 | ___do___ | 32 | 8.5 | 20.2 | 0.67 |
| XXXI | 15 | K₂ Glutarate | 36 | 6.3 | 17.8 | 0.39 |
| XXXII | 15 | ___do___ | 30 | 4.1 | 15.8 | 0.40 |
| XXXIII | 13 | K₂ Tartrate | 26 | 4.1 | 14.8 | 0.42 |
| XXXIV | 13 | KH Glutamate | 33 | 7.5 | 17.8 | 0.63 |

Examples VI to XXXIV are set forth to illustrate the synergistic effect that has been discovered to result when potassium acetate is mixed with the potassium salts of aliphatic saturated dicarboxylic acids. This surprising result allows one to prepare a laminate with penetration resistance which surpasses the superior penetration resistance of those laminates listed in Table I which did not use the synergistic mixtures. Even more surprising is the fact that the superior impact resistance of the synergistic mixtures is achieved at titer levels lower than those where the salts comprising the synergistic mixtures are used alone. Excellent results are achieved even at titer levels lower than 25.

This synergistic effect becomes readily apparent when one contrasts the Alkalinity Titer and Mean Break Height of Examples I–III with those of VI to XVI. In the former case where only one salt is used, the lowest titer that will give a Mean Break Height of 16 feet with a 30 gauge interlayer is 56 in I (d) and 35 in II (c). When the salts used in I (d) and II (c) are combined as in Examples VI–XVI a Mean Break Height of over 16 feet is achieved at a titer lever of 17. Examples VIII and XXV using the same two salts illustrates the criticality of the proportion of metal acetate to metal salt of dicarboxylic acid by demonstrating the loss of the synergistic effect as the titer due to metal acetate becomes 80% or more of the total titer.

The same type of synergism only to a lesser extent is shown with K acetate and KH glutarate when one contrasts Examples I and IV (c) with Examples XXIX and XXX. In these examples the titer levels are about the same but the synergistic mixtures show a higher Mean Break Height.

Examples XVII and XIX once again point out the criticality of having at least 5 cc. of titer but not more than 80% of the total Alkalinity Titer due to the metal acetate.

The case for metal acetate/metal adipate synergism may be found by contrasting Examples XXI–XXII with Examples I and V.

Examples XXIII–XXIV are included to illustrate the loss of synergistic effect when one uses a dicarboxylic acid of 10 or more carbon atoms.

Examples XXXII–XXXIV are set forth to show that equally good results may be obtained when one uses salts of substiuted dicarboxylic acids.

The examples in Table III which were prepared and tested according to the method of Example I are included to demonstrate that equally good results are obtained when one uses a mixture of full or partial salts of the same dicarboxylic acid or when one uses mixtures of different metal acetates or metal salts of different dicarboxylic acids.

TABLE III.—EXAMPLES XXXV–XXXVII

| Example | Metal Acetate | Titer, cc. | Salt Added | Titer, cc. | Total Titer, cc. | Mean Break Height (Feet) | | Percent H₂O |
|---|---|---|---|---|---|---|---|---|
| | | | | | | 15 gauge | 30 gauge | |
| XXXV | K Acetate | 10 | {KH Succinate / K₂ Succinate} | 3 / 2 | 15 | 4.9 | 15.3 | 0.43 |
| XXXVI | {K Acetate / Na Acetate} | 10 / 2 | {KH Glutarate / K₂ Glutarate} | 5 / 4 | 21 | 7.6 | 19.9 | 0.45 |
| XXXVII | K Acetate | 10 | {KH Succinate / KH Glutarate} | 5 / 5 | 20 | 7.2 | 18.5 | 0.40 |

This reduction in titer level has been found to correspond to improved color in the glass laminate presumably because the high salt content heretofore necessary to achieve higher titer and good penetration resistance also caused some discoloration. This reduced color with the synergistic mixtures of salts is especially important where the laminate needs to be of the highest clarity, such as when used as windshields in vehicles. This improvement is illustrated in Table IV.

TABLE IV.—PERCENT YELLOW DETERMINATION

| Example | Salt | Total Titer, cc. | Mean Break Height (Feet) | | Percent Yellow |
|---|---|---|---|---|---|
| | | | 15 gauge | 30 gauge | |
| I(d) | K Acetate | 56 | 5.8 | 16.0 | 18.4 |
| II(b) | KH Succinate | 21 | 3.5 | 14.0 | 15.5 |
| IV(b) | KH Glutarate | 23 | 4.1 | 15.4 | 15.5 |
| XII | K Acetate-KH Succinate | 24 | 8.5 | 19.4 | 15.2 |
| XXIX | K Acetate-KH Glutarate | 27 | 8.0 | 20.1 | 13.2 |
| XXI | K Acetate-KH Adipate | 32 | 5.7 | 16.8 | 11.1 |
| XXXII | K Acetate-K₂ Glutarate | 30 | 4.1 | 15.8 | 14.6 |
| XVI | K Acetate-K₂ Succinate | 37 | 7.5 | 19.2 | 11.7 |

The percent yellow determination is carried out using a 7.5% resin solution in methanol and a Klett-Summerson Photoelectric Colorimeter. The absorption is measured at 420 millimicrons with a blue filter and at 660 millimicrons with a red filter and the readings converted to percent transmission. Subtraction of the 420 millimicron reading from the 660 millimicron reading gives the percent yellow.

A comparison of the data in Table IV further illustrates the advantage of using synergistic mixtures of metal acetates and metal salts of dicarboxylic acids over either one alone by showing the improved penetration resistance and the lower color obtained with the synergistic mixtures.

Potassium acid glutarate (KH glutarate) when incorported into an interlayer has been found to result in a laminate which had good penetration resistance approaching that of the synergistic mixtures. However, Example IV (b) in Table IV indicates that a higher degree of color is present in the KH Glutarate sample even at low titer levels. By comparison, Example XXIX with the synergistic mixture at around the same titer level shows a better Mean Break Height and better color.

*Examples XXXVIII to XLV*

Examples XXXVII to XLV, prepared according to the procedure of Example I, are intended to show the wide variety of metal salts of aliphatic saturated dicarboxylic acids that can be used in the practice of this invention. The sets of 10 glass laminates are prepared and tested according to the procedure of Example I.

The metal portion of the acetate salts used in the practice of this invention may be selected from the alkali and alkaline earth metals, and metals of Groups I–B, II–B and III–A of the Periodic Table (as set forth on pages 56–57 of Lange's Handbook of Chemistry, 9th Ed.), or mixtures thereof. Potassium acetate is preferred because of the lower titer levels necessary to achieve improved penetration resistance and the improved color in the resulting laminate.

The saturated aliphatic dicarboxylic acids used should contain from 4 to 9 carbon atoms. These would include succinic, glutaric, adipic, pimelic, suberic and azelaic acids and mixtures thereof as well as organic substituted derivatives, such as 1,2-dimethyl succinic acid, tartaric acid, and mixtures of the foregoing. Substituted acids may include those having hydroxy, chloro, phenyl or amino substituents. These salts include the full salts as well as the acid salts of any and all of the above acids. Mixtures of any and all of the above are also contemplated. Generally, as the chain length of the acid increases beyond 9 carbons, objectionably high titer levels are needed to achieve comparable penetration resistance. The use of the lower acids, namely oxalic and malonic, results in undesirable color and poor penetration resistance. More preferably, salts of succinic, glutaric and adipic acids would be used.

The metal portion of the salt of the dicarboxylic acid may be selected from the alkali metals and alkaline earth metals, and metals of Groups I–B, II–B and III–A of the Periodic Table, or mixtures thereof. Potassium salts are

| Example | K Acetate Titer, (cc.) | Salt Added | Total Titer, (cc.) | Mean Break Height, feet | | Percent H₂O |
|---|---|---|---|---|---|---|
| | | | | 15 gauge | 30 gauge | |
| XXXVIII | 15 | NaH Succinate | 30 | 3.7 | 14.0 | 0.42 |
| XXXIX | 15 | Na₂ Succinate | 28 | 5.3 | 15.8 | 0.49 |
| XL | 13 | KNa Succinate | 23 | 6.2 | 16.9 | 0.44 |
| XLI | 15 | ZN Glutarate | 36 | 5.7 | 16.8 | 0.39 |
| XLII | 0 | Mg Succinate | 27 | 2.6 | 10.9 | 0.52 |
| XLIII | 13 | ----do-------- | 40 | 7.5 | 17.8 | 0.46 |
| XLIV | 13 | Li H Succinate | 37 | 4.7 | 15.0 | 0.41 |
| XLV | 0 | ----do-------- | 50 | 2.3 | 8.5 | 0.42 |

*Examples XLVI to XLVIII*

Examples XLVI to XLVIII, prepared according to the procedure of Example I, are included to illustrate the wide variety of metal acetates in combination with metal salts of aliphatic saturated dicarboxylic acids that can be used in the practice of this invention.

preferred because of the lower titer levels achieved and the improved color in the resulting laminate.

It has been found that the titer contribution of the respective salts, e.g., metal acetates and metal salts of saturated aliphatic dicarboxylic acid, is critical and must be maintained within certain limits if the synergistic effect at low titer levels is to be achieved. The metal acetate

| Example | Metal Acetate | Titer, (cc.) | Salt Added | Total Titer, (cc.) | Mean Break Height (feet) | |
|---|---|---|---|---|---|---|
| | | | | | 15 gauge | 30 gauge |
| XLVI | Cu Acetate | 20 | KH Succinate | 35 | 7+ | 17+ |
| XLVII | Zn Acetate | 21 | Al Succinate | 37 | 7+ | 18+ |
| XLVIII | Mg Acetate | 18 | KH Succinate | 38 | 7+ | 16+ | should contribute at least a titer of 5 and up to 80% of the total Alkalinity Titer.

The laminated safety-glass of this invention is especially efficient in that the improved resistance to penetration is balanced over a wide temperature range. The impact tests shown in the examples are conducted at room temperature, however, tests conducted at as low as 4° F. and as high as 120° F. indicate that these laminates exhibit improved properties over a wide temperature range.

It is well known that an increase in the thickness of the plasticized polyvinyl butyral interlayer will give some improvement to the penetration resistance of the laminates. This invention is equally applicable to the thicker laminates. In fact the use of an 0.030 inch interlayer containing these synergistic mixtures of salts results in Mean Break Heights more than double those of the 0.015 inch interlayers of the examples. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts against stationary objects even where the automobile was travelling at speeds in excess of 25 m.p.h. In other words, at normal interlayer moisture contents, if the alkalinity level is controlled in accordance with the practice of this invention, a far superior safety laminate will result.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is preferred that the moisture content be maintained rather low, i.e., 0.1 to 0.8%. On the other hand, the Alkalinity Titer of the polyvinyl butyral interlayer can be readily increased by the addition of these synergistic mixtures of salts during the preparation of the polyvinyl butyral resin. The minimum quantity of synergistic mixtures of salts necessary to effect a particular improvement in penetration resistance of the final laminate has been found to be inversely proportional in some degree to the preferred moisture content. The amount of moisture is generally kept within the range of 0.1 to 0.8% with the interlayers of this invention.

Higher moisture levels are undesirable because of the tendency to cause bubbles or blisters in the laminate. Lower moisture levels are especially difficult to attain and maintain, and in fact, it appears as if some amount of moisture is desirable. It is preferable that the interlayers have a moisture content of 0.2 to 0.6%.

Table V illustrates the small effect of moisture within the normal moisture range in the absence of any salts on the impact strength of various sets of glass laminates. The plasticized interlayer sheets having an Alkalinity Titer of zero are prepared from a resin thoroughly washed after swelling in alcohol-water as described below.

TABLE V.—EFFECT OF MOISTURE ON MEAN BREAK HEIGHT

| Alkalinity Titer | Percent Moisture Content | Mean Break Height, feet | |
|---|---|---|---|
| | | 15 Gauge Interlayer | 30 Gauge Interlayer |
| 0 | .06 | 2.3 | 7.5 |
| 0 | .31 | 2.4 | 7.7 |
| 0 | .37 | 2.4 | 7.8 |
| 0 | .50 | 2.8 | 8.0 |
| 0 | .75 | 3.0 | 8.3 |

In order to avoid alkali burns on processing of the resin during plasticization or extrusion and to avoid excessive sensitivity to moisture in the interlayers which may result in edge separation of the laminates it is highly preferred to limit the Alkalinity Titer so that it is not over 50. For the above reasons, it is a preferred embodiment of this invention to limit the Alkalinity Titer to a maximum of 50 within the range of 0.1 to 0.8% moisture content. The lower limit of effectiveness of the Alkalinity Titer for improved impact strength is about 10. Within a moisture content of 0.2 to 0.6%, a preferred range of Alkalinity Titer is 15 to 40. Within this preferred range especially good properties are found at 15 to 25 and especially high impact strengths are obtained at 20 to 35 titer.

In the preparation of the safety-glass laminates as described in the preceding examples, the glass and polyvinyl butyral interlayers were maintained as clean as is feasibly possible under carefully controlled conditions. The presence of lint, dust, atmospheric oils, etc., on the surface of either the glass or interlayer will affect the Mean Break Height results. If the glass or plastic is contaminated by these impurities to any great extent, the effect on Mean Break Height results can be substantial. However, the intent of the safety-glass laminators is to produce laminates as contamination-free as possible, thus reducing this problem to a minimum.

In general, the laminates are prepared by interposing the plasticized polyvinyl butyral interlayer between a pair of glass plates and then subjecting the resulting assembly to a temperature of 190° to 325° F. and a pressure of 150 to 225 p.s.i. for at least 10 minutes to bond the assembly together.

The polyvinyl acetal resins which are employed in the present invention may be made from various unsubstituted ketones containing an active carbonyl group or from mixtures of unsubstituted aldehydes and ketones. Thus, formaldehyde, acetaldehyde, proprionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexylate, etc. in the presence of a solvent for the product and precipitating the resin product with water. Alternate methods might include carrying out the reaction in the presence of a non-solvent dispersing medium such as water or a non-solvent mixture of water and solvent, e.g., water-ethanol mixture. More detailed methods for preparing such resins are set forth in Morrison et al. U.S. Patent No. Re. 20,430, dated June 29, 1937, and Lavin et al. U.S. Patent No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general the polyvinyl acetal resins employed have Staudinger molecular weights ranging from about 50,000 to 600,000 and preferably from 150,000 to 270,000 and may be considered to be made up, on a weight basis, of from 5 to 25% hydroxyl groups, calculated as polyvinyl alcohol, 0 to 40% ester, and preferably acetate groups, calculated as polyvinyl ester, eg., acetate, and the balance substantially acetal. When the acetal is butyraldehyde acetal, the polyvinyl acetal resin will preferably contain, on a weight basis, from 9 to 30% hydroxyl groups, calculated as polyvinyl alcohol and from 0 to 3% ester, e.g., acetate, groups, calculated as polyvinyl ester, the balance being substantially butyraldehyde acetal.

The resin prepared according to the above methods will contain approximately 10–40 cc. Alkalinity Titer which is generally composed of potassium acetate or sodium acetate depending on the process used. In order to replace these salts with the salts of this invention, the resin is swelled in a mixture of alcohol-water (0.960 sp. gr.) at about 40° C. for about 1 hour and then washed thoroughly with water until the dried resin is neutral to brom-phenol blue in the Alkalinity Titer test. Appropriate amounts of the salts of this invention are then added to a slurry of the washed zero Alkalinity Titer resin (5 parts water per part of resin). After thirty minutes the grains are filtered and dried. Uniform distribution of the salts is further effected by the plasticization step. However, it is readily apparent that when one uses the synergistic mixtures of this invention it may not be necessary to wash any or all of the metal acetate out of the resin. In instances where the proper amount of metal acetate is already present in the resin, as a result of the stabilization procedure, one would simply add the desired amount of the metal salt of the dicarboxylic acid.

An alternative method of adding the salts to a zero titer resin is by adding it with the plasticizer during the plasticization step.

The resin produced may be plasticized to the extent of about 20 to 80 parts plasticizer per 100 parts resin and more commonly between 40 and 50 parts for normal windshield use. This latter concentration is generally used with polyvinyl butyrals containing 18 to 23% vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and di-(betabutoxyethyl) adipate. The resulting plasticized resin mixture is then generally extruded in the form of sheets and cut to size to produce the interlayers used in the present invention. The plasticized polyvinyl butyral resin interlayer is self-adhesive in nature thereby eliminating the need for a separate adhesive to bond the glass laminate together.

Safety-glass laminates find special application in the automotive and aircraft industries for protecting passengers both against the hazards of flying objects and to reduce injury caused by bodily impact against the laminate. Wherever else glass or transparent panels are utilized such as in the building trade, the protection afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed is:

1. An improved laminated safety-glass comprising two layers of glass bonded to a plasticized polyvinyl acetal interlayer; said interlayer having a moisture content of 0.1 to 0.8% by weight and containing sufficient salts of organic acids to produce an Alkalinity Titer of 10 to 50, said salts being a mixture of at least one metal acetate and at least one metal salt of a saturated aliphatic dicarboxylic acid of from 4 to 9 carbon atoms, wherein, in each instance, said metal is independently selected from the group consisting of alkali metals, alkaline earth metals, and metals of Groups I–B, II–B and III–A of the Periodic Table, said mixture containing sufficient metal acetate to produce an Alkalinity Titer of at least about 5 and up to about 80% of the total Alkalinity Titer.

2. An improved laminated safety-glass as in claim 1 wherein the polyvinyl acetal is polyvinyl butyral.

3. An improved laminated safety-glass in in claim 2 wherein the polyvinyl butyral has a vinyl alcohol content of 9 to 30% by weight and is plasticized with from 20 to 50 parts plasticizer per 100 parts polyvinyl butyral.

4. An improved laminated safety-glass as in claim 2 wherein the dicarboxylic acid salt is potassium acid succinate and the metal acetate is potassium acetate.

5. An improved laminated safety-glass as in claim 2 wherein the dicarboxylic acid salt is potassium acid glutarate and the metal acetate is potassium acetate.

6. An improved laminated safety-glass as in claim 2 wherein the dicarboxylic acid is a mixture of potassium acid succinate and potassium succinate and the metal acetate is a mixture of sodium acetate and potassium acetate.

7. An improved laminated safety-glass as in claim 2 wherein the dicarboxylic acid salt is a mixture of potassium acid succinate and potassium acid glutarate and the metal acetate is potassium acetate.

8. An improved laminated safety-glass as in claim 2 wherein the dicarboxylic acid salt is a mixture of potassium glutarate and the potassium acid glutarate and the metal acetate is a mixture of potassium acetate and sodium acetate.

9. An improved laminated safety-glass comprising two layers of glass bonded to a plasticized polyvinyl acetal interlayer; said interlayer having a moisture content of 0.2 to 0.6% by weight and containing sufficient salts of an organic acid to produce an Alkalinity Titer of 15 to 35, said salts being a mixture of at least one metal acetate and at least one metal salt of a saturated aliphatic dicarboxylic acid from 4 to 9 carbon atoms, wherein, in each instance, said metal is independently selected from the group consisting of alkali metals, alkaline earth metals, and metals of Groups I–B, II–B and III–A of the Periodic Table, said mixture containing sufficient metal acetate to produce an Alkalinity Titer of at least about 5 and up to about 70% of the total Alkalinity Titer.

10. An improved interlayer for laminated safety-glass comprising a plasticized polyvinyl acetal resin; said interlayer having a moisture content of 0.1 to 0.8% and containing sufficient salts of organic acids to produce an Alkalinity Titer of 10 to 50, said salts being a mixture of at least one metal acetate and at least one metal salt of a saturated aliphtic dicarboxylic acid of from 4 to 9 carbon atoms, wherein, in each instance, said metal is independently selected from the group consisting of alkali metals, alkaline earth metals, and metals of Groups I–B, II–B and III–A of the Periodic Table, said mixture containing sufficient metal acetate to produce an Alkalinity Titer of at least about 5 and up to about 80% of the total Alkalinity Titer.

11. An improved interlayer as in claim 10 wherein the polyvinyl acetal is polyvinyl butyral.

12. An improved interlayer of laminated safety-glass comprising a plasticizer polyvinyl acetal resin; said interlayer having a moisture content of 0.2 to 0.6% and containing sufficient salts or organic acids to produce an Alkalinity Titer of 15 to 35, said salts being a mixture of at least one metal acetate and at least one metal salt of a saturated aliphatic dicarboxylic acid of from 4 to 9 carbon atoms, wherein, in each instance, said metal is independently selected from the group consisting of alkali metals, alkaline earth metals, and metals of Groups I–B, II–B, and III–A of the Periodic Table, said mixture containing sufficient metal acetate to produce an Alkalinity Titer of at least about 5 and up to about 70% of the total Alkalinity Titer.

13. An interlayer as in claim 11 wherein the polyvinyl butyral has a vinyl alcohol content of 9 to 30% by weight and is plasticized with from 20 to 50 parts plasticizer per 100 parts of polyvinyl butyral.

14. An interlayer as in claim 11 wherein the dicarboxylic acid salt is a mixture of potassium succinate and potassium acid succinate and the metal acetate is potassium acetate.

15. An interlayer as in claim 11 wherein the dicarboxylic acid salt is potassium acid glutarate and the metal acetate is potassium acetate.

16. An interlayer as in claim 11 wherein the dicarboxylic acid salt is a mixture of potassium acid succinate and potassium acid glutarate and the metal acetate is a mixture of sodium acetate and potassium acetate.

17. An interlayer as in claim 11 having a thickness between 0.010 and 0.065 inch.

18. An interlayer as in claim 11 having a thickness between 0.025 and 0.35 inch.

19. The method of preparing an improved plasticized polyvinyl acetal interlayer which comprises mixing an aqueous slurry of a polyvinyl acetal resin containing metal acetate with sufficient metal salts of saturated aliphatic dicarboxylic acid to produce a total Alkalinity Titer in the resin of 10 to 50, said resin containing sufficient metal acetate to produce a titer of at least about 5 and up to about 80% of the total titer, filtering the resin and adjusting the moisture content of the resin to 0.1 to 0.8% by weight, plasticizing the resin, and forming the interlayer.

References Cited by the Examiner
UNITED STATES PATENTS

| | | | |
|---|---|---|---|
| 2,456,462 | 12/1948 | Stamatoff | 260—73 |
| 2,496,480 | 2/1950 | Lavin et al. | 260—73 |
| 2,720,501 | 10/1955 | Van Ness | 260—73 |
| 2,859,207 | 11/1958 | Dahle | 260—73 |
| 2,860,122 | 11/1958 | Berardinelli et al. | 260—73 |
| 2,946,711 | 7/1960 | Bragaw et al. | 161—199 |

ALEXANDER WYMAN, *Primary Examiner.*

W. J. VAN BALEN, *Assistant Examiner.*